United States Patent [19]

Reinartz et al.

[11] Patent Number: 4,643,489
[45] Date of Patent: Feb. 17, 1987

[54] HYDRAULIC BRAKE SYSTEM WITH SLIP CONTROL

[75] Inventors: Hans-Dieter Reinartz, Frankfurt am Main; Helmut Steffes, Eschborn, both of Fed. Rep. of Germany

[73] Assignee: Alfred Teves GmbH, Frankfurt am Main, Fed. Rep. of Germany

[21] Appl. No.: 699,650

[22] Filed: Feb. 8, 1985

[30] Foreign Application Priority Data

Feb. 18, 1984 [DE] Fed. Rep. of Germany ....... 3405967

[51] Int. Cl.$^4$ .......................... B60T 8/44; B60T 11/08; F15B 7/08; F15B 7/00
[52] U.S. Cl. ..................................... 303/114; 60/575; 60/578; 60/589; 60/591
[58] Field of Search ...................... 60/547.1, 548, 560, 60/575, 589, 591, 578; 303/114, 115, 116

[56] References Cited

U.S. PATENT DOCUMENTS

| | | | |
|---|---|---|---|
| 3,557,555 | 1/1971 | Wilson et al. | 60/589 X |
| 4,072,014 | 2/1978 | Gardner | 60/575 |
| 4,523,791 | 6/1985 | Belart et al. | 303/114 X |

Primary Examiner—Robert E. Garrett
Assistant Examiner—George Kapsalas
Attorney, Agent, or Firm—James B. Raden; William J. Michals

[57] ABSTRACT

A hydraulic brake system with slip control, in particular for automotive vehicles, comprising a master cylinder (2) actuatable by a hydraulic power booster (1), in which brake system valve means (23, 24, 28, 29, 32, 33, 34, 35) are inserted between the master cylinder (2) and the wheel brakes (25, 26, 30, 31), connected to the master cylinder (2) which allow to remove pressure fluid from the wheel brakes (25, 26, 30, 31), while the pressure fluid taken from the wheel brakes (25, 26, 30, 31) can be replenished out of the pressure chamber (10) of the hydraulic power booster (1), wherein the master cylinder piston (5) is designed as a stepped piston and an annular surface (18) of the master cylinder piston (5) remote from the working chamber (16) is adapted to be acted upon by the pressure of the working chamber (16), and wherein the chamber (19) confined by the annular surface (18) is connectible to an unpressurized supply reservoir (11) by way of a travel-responsively controllable valve (51). For reducing wear of the annular seal (48) arranged at the master cylinder piston (5) and susceptibility of the valve (51) to dirt, an annular member (50) lying opposite to the annular surface (18) includes an axial channel (49) connectable with the reservoir (11). A resiliently preloaded sealing member (61) is supported at the port of the axial channel (49) and is adapted to lift from the port due to displacement of the master cylinder piston (5).

4 Claims, 2 Drawing Figures

HYDRAULIC BRAKE SYSTEM WITH SLIP CONTROL

BACKGROUND OF THE INVENTION

The present invention relates to a hydraulic brake system with slip control for automotive vehicles comprising a master cylinder actuatable by a hydraulic power booster in which brake system valve means are inserted between the master cylinder and the wheel brakes connected to the master cylinder which allow removal of pressure fluid from the wheel brakes. The pressure fluid taken from the wheel brakes is replenished out of the pressure chamber of the hydraulic power booster. The master cylinder piston is designed as a stepped piston and an annular surface of the master cylinder piston remote from the working chamber is adapted to be acted upon by the pressure of the working chamber. The chamber confined by the annular surface is connectable to a reservoir by way of a travel-responsive controllable valve.

A vehicle hydraulic brake system is known wherein a tandem master cylinder is used for the pressure supply of the wheel brakes. In turn, the tandem master cylinder is actuatable by way of a hydraulic power booster, the pressure chamber of which can be supplied by way of a brake valve with hydraulic pressure which is proportional to the actuating force respectively applied on the brake pedal. The master cylinder piston is designed as a stepped piston and confines with a pedal-close annular surface a chamber which is connectable to an unpressurized supply reservoir by way of a travel-responsive controllable valve. The valve is composed substantially of a bore terminating radially into the master cylinder housing, which bore is normally closed by the larger piston step of the master cylinder piston and which will be released when the master cylinder piston has performed a predetermined axial displacement. The bore leading radially into the master cylinder housing may be considered as breather bore.

By way of valve means controllable by a slip control electronics, there is in the state of brake release and during normal braking operations hydraulic communication between the chamber confined by the annular surface of the master cylinder piston and the working chamber of the master cylinder. This has as a result that the cross-sectional surface of the smaller piston step of the master cylinder piston is exclusively responsible for the pressure generation in the working chamber of the master cylinder. During control action, this will cause isolation of the chamber confined by the annular surface of the master cylinder piston by means of a change-over valve. Simultaneously, the working chamber of the master cylinder is acted upon by the dynamic pressure prevailing in the pressure chamber of the hydraulic power booster. A resetting force is exerted on the master cylinder piston by the pressure now prevailing in the working chamber. In case the bore terminating radially into the master cylinder housing is still closed by the peripheral surface of the master cylinder piston, there will be no resetting of the master cylinder piston. On the other hand, resetting of the master cylinder piston will be effected when the bore terminating radially into the master cylinder housing has already been released by the peripheral surface of the larger piston step of the master cylinder piston. In this event, pressure fluid escapes from the chamber confined by the pedal-side annular surface of the master cylinder piston via the bore terminating radially into the master cylinder housing and via a correspondingly actuated change-over valve into the pressure supply reservoir. The resetting movement will last until the bore terminating radially into the master cylinder housing is closed again by the peripheral surface of the larger piston step of the master cylinder piston. In this operating condition, the chamber confined by the master cylinder piston is again isolated hydraulically.

It is a disadvantage in the described device that the bore terminating radially into the master cylinder housing must have a relatively small cross-section. On the one hand, a relatively small cross-section of the bore terminating into the master cylinder housing has as a consequence that the resetting movement of the master cylinder piston will be damped on pressurization of the working chamber, while on the other hand the wear of the annular seal arranged at the larger piston step of the master cylinder piston will be reduced. In contrast thereto, there is the danger with such throttle bores that they become stuffed inadvertently by dirt particles in the brake system.

It is therefore an object of the present invention to improve upon a hydraulic brake system of the species initially referred to such that malfunctions due to dirt particles in the pressure line system will be excluded to the greatest extent possible.

SUMMARY OF THE INVENTION

This object is achieved by the present invention in that an annular member lying opposite to the annular surface disposes of an axial channel connectable to the reservoir, and in that supported at the port of the axial channel is a resiliently preloaded sealing member which is adapted to lift from said port as a result of displacement of the master cylinder piston. In such an embodiment, the axial channel can favorably be dimensioned such as to ensure greatest likelihood that unwanted closure due to dirt particles is precluded. In addition, there will be a considerable reduction of wear of the annular seal arranged in the larger piston step of the master cylinder.

In an advantageous embodiment of the present invention, a first compression spring is moved into abutment on the sealing member, the compression spring being supported on a spring plate bearing against a step of the master cylinder piston. Further, there is provision that a lug is coupled to the sealing member which penetrates the spring plate and which allows positive connection to said spring plate. Consequently, upon displacement of the master cylinder piston, the spring plate will move in the brake's actuating direction on account of the compression spring clamped in between the spring plate and the sealing member, the sealing member sealing the axial channel in the annular member for the time being. Above a displacement travel of the master cylinder piston predefined by construction, the lug is in positive engagement with the spring plate, so that the sealing member will lift from the port of the axial channel in the annular member, and a hydraulic connection can be established between the chamber confined by the pedal-side annular surface of the master cylinder piston and the unpressurized supply reservoir. It will be expedient in this respect to have a second compression spring clamped in between the spring plate and the annular member, the said spring maintaining the spring plate in constant abutment on the piston step of the master cylinder piston.

BRIEF DESCRIPTION OF THE DRAWING

An embodiment of the present invention will be described in more detail hereinbelow by way of FIG. 1 and FIG. 2 with reference to the accompanying drawing wherein.

DETAILED DESCRIPTION

Figure 1:
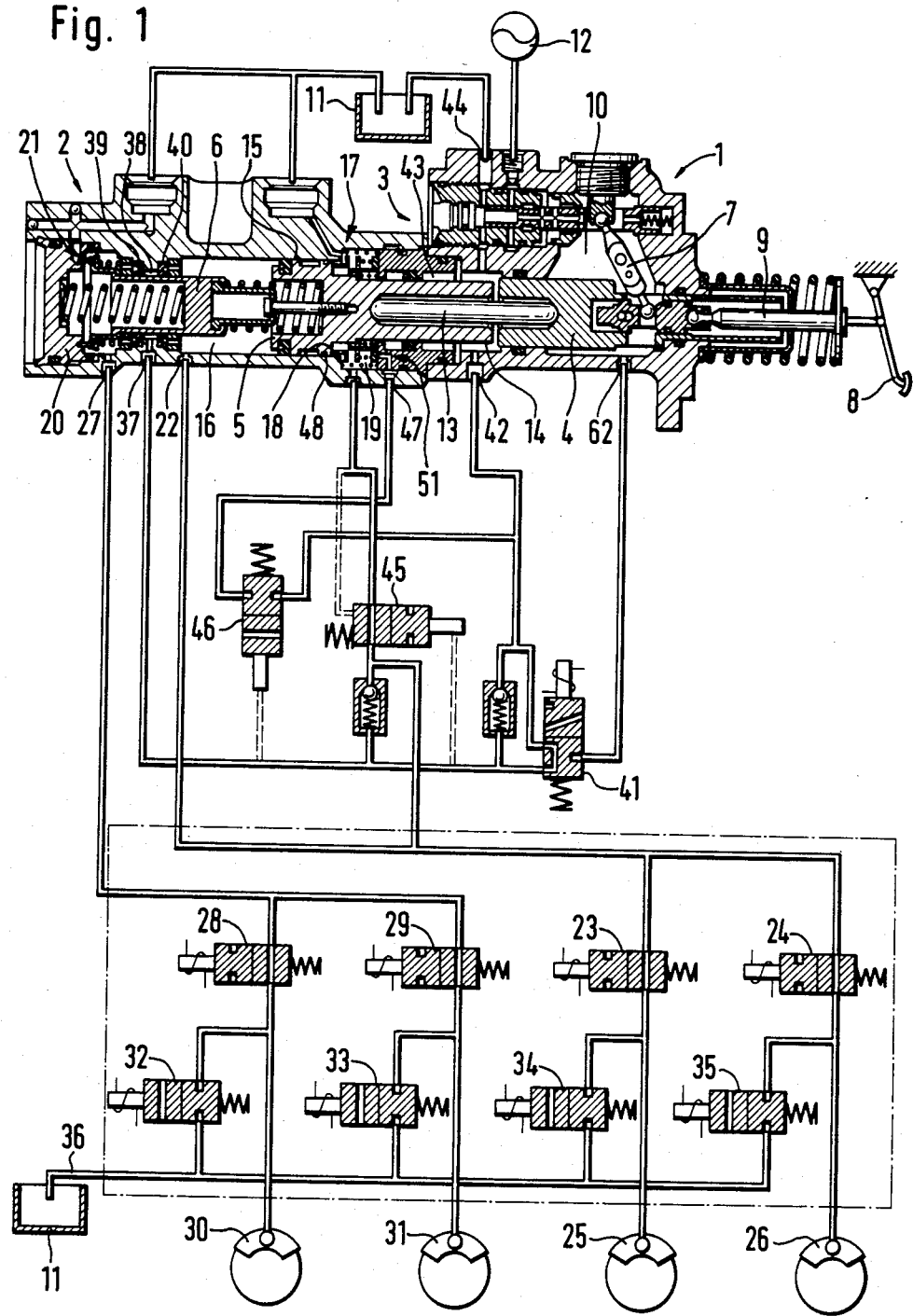
FIG. 1 is a brake system of the present invention in cross-section.

Elements corresponding to one another have been assigned like reference numerals. In the drawing, reference numeral 1 designates a hydraulic power booster serving to actuate a tandem master cylinder 2. The hydraulic power booster comprises a brake valve 3 which is arranged substantially in parallel to the axis of a booster piston 4 or to master cylinder pistons 5, 6, respectively. Said brake valve 3 is connected by way of a lever actuation 7 with a push rod 9 coupled to a brake pedal 8. The hydraulic power booster 1 further comprises a pressure chamber 10 which, in the brake's release position, communicates via the brake valve 3 with an unpressurized supply reservoir 11. When the brake pedal 8 is force-applied, pressure fluid is supplied from a hydropneumatic pressure accumulator 12 into the pressure chamber 10 so that a pressure proportional to the actuating force develops in the pressure chamber 10.

The master cylinder piston 5 is arranged coaxially to the booster piston 4 and is displaceable in the actuating direction by a rod 13 interposed between the pistons 4, 5.

The master cylinder piston 5 is designed as a stepped piston, the piston step 14 of smaller diameter facing the booster piston 4, while the piston step 15 of larger diameter confines a working chamber 16 of the master cylinder 2. Normally, said working chamber 16 is in communication with the unpressurized supply reservoir 11 via a travel-responsively controllable valve 17. Between the piston steps 14, 15, the master cylinder piston 5 comprises an annular surface 18 which confines an annular chamber 19. The master cylinder piston 6 is arranged coaxially relative to the pistons 5, 6 and is displaceable in the actuating direction by a pressure developing in the working chamber 16. The master cylinder piston 6 bounds a second working chamber 20 which, in the brake's release position, has a connection to the unpressurized supply reservoir 11 via a valve 21 which corresponds to the valve 17.

Terminating into the first working chamber 16 is a housing port 22 to which, by way of electromagnetically actuatable two-way/two-position control valves 23, 24, wheel brakes 25, 26 are connected which are disposed at the rear axle of an automotive vehicle, for instance. Communicating with the working chamber 20 of the master cylinder 2 is a housing port 27 to which, via electromagnetically actuatable valves 28, 29, wheel brakes 30, 31 are connected which are disposed at the front axle of the automotive vehicle, for instance. Between the electromagnetically actuatable valves 23, 24, 28, 29 which are controllable by non-illustrated slip control electronics and which normally assume an opened position, there are connected electromagnetically actuatable two-way/two-position valves 32, 33, 34, 35 which are likewise controllable by the non-illustrated slip control electronics and which normally assume a closed position. Connected to the electromagnetically actuatable two-way/two-position control valves 32, 33, 34, 35 is one joint return line 36 leading to the unpressurized supply reservoir 11. By suitably connecting the two-way/two-position control valves allocated to the wheel brakes 25, 26, 30, 31, it will be rendered possible to maintain the pressure in each wheel brake 25, 26, 30, 31 constant or to decrease it irrespective of the pressures prevailing in the working chambers 16, 20 so that an imminent locked condition can be averted.

The master cylinder 2 disposes of another housing port 37 which ends radially into an annular chamber 38. Connections between the housing port 37 and the working chambers 16, 20 of the master cylinder 2 can be established via the annular chamber 38 and via sealing sleeves 39, 40 acting as check valve. In the brake's release position and during normal braking operations (without slip control), said housing port 37 is in communication with the unpressurized supply reservoir 11 via a three-way/two-position control valve 41, a housing port 42, a housing chamber 43 and a housing port 44. The three-way/two-position control valve 41 is connected with the pressure chamber 10 of the hydraulic power booster 1 via a housing port 62 and corresponding pressure lines. Said three-way/two-position control valve 41 is likewise controllable by the non-illustrated slip control electronics and, when energized, will connect the pressure chamber 10 of the hydraulic power booster 1 to the annular circumferential chamber 38.

A further component of the inventive brake system is a two-way/two-position control valve 45 which normally adopts an opened position and thus constitutes a connection between the working chamber 16 of the master cylinder 2 and the annular chamber 19. The valve is controllable pressure-responsively, and it will be switched over the closed position as soon as the circumferential annular chamber 38 is connected to the pressure chamber 10 of the hydraulic power booster 1. Accordingly, the pressure in the pressure chamber 10 of the hydraulic power booster 1 permits to drive another two-way/two-position control valve 46 which normally adopts a closed position. On the one hand, said two-way/two-position control valve 46 is in connection with the housing port 42 and, respectively, with the unpressurized supply reservoir 11. On the other hand, a pressure line leads from said two-way/two-position control valve 46 to a housing port 47, the said housing port 47 being in hydraulic communication with an axial channel 49 in an annular member 50.

Figure 2:
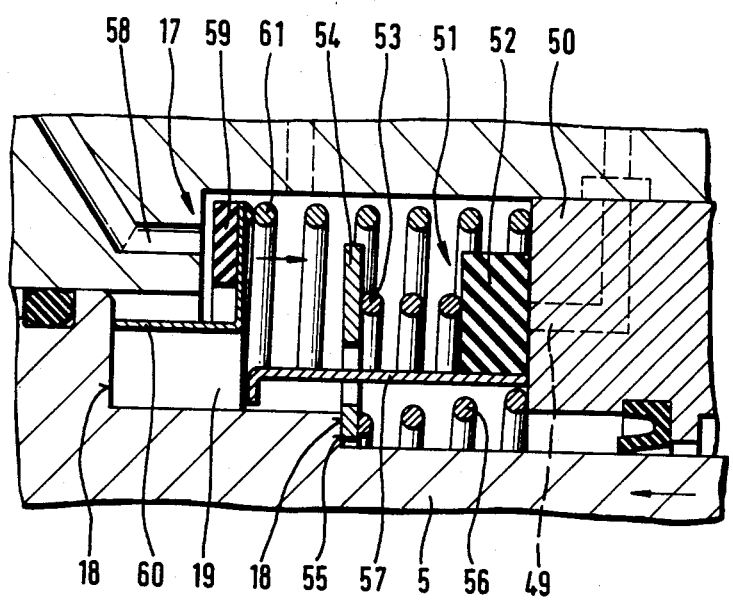
FIG. 2 is a cross-section taken across a travel-responsively controllable valve in accordance with the present invention.

As is discernible in detail from FIG. 2, the axial channel 49 is a component part of a travel-responsively controllable valve 51, wherein a sealing member 52 normally is biassed by a compression spring 53 to abut on the port of the axial channel 49. Said compression spring 53 takes support on a spring plate 54 which bears against a step 55 of the master cylinder piston 5 and which is maintained in abutment thereon by a compression spring 56. The end of the compression spring 56 remote from the spring plate 54 bears against the annular member 50. Rigidly connected to the sealing member 52 is a lug 57 which projects through the spring plate and which is adapted to be moved into a positive engagement with the spring plate 54 after a predeterminable displacement travel of the master cylinder piston 5 and the spring plate 54, respectively.

The valve 17 which interrupt a hydraulic connection between the chamber 19 and the unpressurized supply reservoir 11, consists substantially of a housing channel 58 terminating into the chamber 19. Arranged opposite to the port of the housing channel 58 in a relatively small spatial relationship therewith is a sealing member 59, the said sealing member 59 being supported in the brake's release position on the master cylinder piston 5 by a stop element 60. Interposed between the annular member 50 and the sealing member 59 is another compression spring 61 which, upon displacement of the master cylinder piston, ensures that the sealing member 59 will abut on the port of the housing channel 58.

The mode of operation of the brake system described will be explained in more detail hereinbelow, starting from the condition of brake release, in which no actuating force is applied on the brake pedal 8 and all parts adopt the position to be seen from the drawings. When an actuating force is applied on the brake pedal 8, the pressure chamber 10 of the hydraulic power booster 1 will first be isolated from the unpressurized supply reservoir 11 by means of the brake valve 3. After a predetermined actuating travel, pressure fluid will be supplied out of the hydropneumatic pressure accumulator 12, via the brake valve 3 into the pressure chamber 10, the pressure prevailing in the pressure chamber 10 being proportional to the actuating force exerted on the brake pedal 8.

After the hydraulic pressure in the pressure chamber 10 of the hydraulic power booster 1 has exceeded a specific level, the booster piston 4 will move to the left, when viewed in the drawing, and this movement of the booster piston 4 will be transmitted via the rod 13 onto the master cylinder piston 5. After the master cylinder piston 5 has performed a small travel, the valve 17 will close and thus isolate the working chamber 16 from the unpressurized supply reservoir 11. Hence, further displacement of the master cylinder piston in the actuating direction, when the valve 17 is closed, will have as a consequence that a hydraulic pressure develops in the working chamber 16 by which likewise the master cylinder piston 6 will be shifted hydraulically in the actuating direction. Accordingly, there is pressure build-up in the second working chamber 20 of the master cylinder 2 also. The hydraulic pressures generated in the working chambers 16, 20 are delivered to the wheel brakes 25, 26, 30, 31 so that the vehicle will be braked.

By way of the opened two-way/two-position control valve 45, the pressure prevailing in the first working chamber 16 likewise propagates into the annular chamber 19 so that exclusively the piston step 14 with smaller diameter will be in charge of the pressure generation in the first working chamber 16.

When the non-illustrated slip control electronics now detects critical slip values at one or at several of the monitored vehicle wheels, first the three-way/two-position control valve 41 will switch over so that the annular chamber 38 of the master cylinder 2 is connected to the pressure chamber 10 of the hydraulic power booster 1. The pressure of the pressure chamber 10 of the hydraulic power booster will be supplied in addition to the control ports of the two-way/two-position control valves 45, 46, causing said valves 45, 46 to switch over. Switching-over of the two-way/two-position control valve 45 has as a result that the annular chamber 19 is shut off hydraulically. Switching-over of the two-way/two-position control valve 46 will establish connection of the housing port 47 to the unpressurized supply reservoir 11.

It shall be assumed in the following that the vehicle wheel allocated to wheel brake 30 has a critical slip value. First the slip control electronics will cause the two-way/two-position control valve 28 to switch to a closed position, as a result whereof the connection between the working chamber 20 of the master cylinder 2 and the wheel brake 30 will be interrupted, and the pressure in the wheel brake 30 will remain constant irrespective of the pressure in the working chamber 20. In case a like period of maintaining the pressure constant will not suffice to bring about re-acceleration of the wheel, likewise the two-way/two-position control valve 32 will be switched over so that pressure fluid is removed from the wheel brake 30. Pressure fluid removed from the wheel brake 30 this way will be replenished out of the circumferential annular chamber 38 via the sealing sleeve 39 into the working chamber 20. The delivery of pressure fluid via the sealing sleeve 40 into the working chamber 16 takes place accordingly, provided pressure fluid was removed from the wheel brakes 25, 26.

In case brake slip control commences at a point of time at which the axial channel 49 is still closed by the sealing member 52, no resetting of the brake pedal 8 will be performed, since although the end face of the larger piston step 15 of the master cylinder piston 5 is acted upon by the pressure in the pressure chamber 10 of the hydraulic power booster 1 in the direction of brake release, the volume of pressure fluid enclosed in the annular chamber 19 acts as a hydraulic obstruction. If, however, the axial channel 49 is already released by the lug 57 or, respectively, the sealing member 52 upon commencement of slip control, a resetting of the brake pedal 8 will be effected, since the end face of the larger piston step 15 is acted upon in the direction of brake release and pressure fluid is allowed to escape out of the annular chamber 19 via the axial channel 49 and the housing port 47 and the opened two-way/two-position control valve 46 to the unpressurized supply reservoir 11. Due to the effect of the two-way/two-position valve 46 defined by construction, this resetting movement will take place in a damped manner.

As soon as the sealing member 52 has moved again into abutment on the port of the axial channel 49, the resetting of the master cylinder piston 5 and, respectively, of the brake pedal 8 is terminated.

During the action of brake release, the sequences of motion described will be reversed until the brake system re-assumes the position discernible from the drawings.

What is claimed is:

1. A hydraulic brake system with slip control for automotive vehicles, comprising a master cylinder actuatable by a hydraulic power booster, in which brake system valve means are inserted between the master cylinder and the wheel brakes connected to the master cylinder which allow removal of pressure fluid from the wheel brakes, means for replenishing the pressure fluid taken from the wheel brakes out of the pressure chamber of the hydraulic power booster, wherein the master cylinder piston is designed as a stepped piston, and an annular surface of the master cylinder piston remote from the working chamber is adapted to be acted upon by the pressure of the working chamber, and wherein the chamber confined by the annular surface is connectable to a reservoir by way of a travel-responsively controllable valve, wherein an annular member (50) lying opposite to the annular surface (18) includes an axial channel (49) having a port and being connectable to the unpressurized supply reservoir (11), and wherein a resiliently preloaded sealing member (52) which is adapted to lift from said port due to displacement of the master cylinder piston (5) is mounted at said port of said axial channel (49).

2. A hydraulic brake system as claimed in claim 1, wherein a first compression spring (53) is in abutment on the sealing member (52), said compression spring being supported on a spring plate (54) bearing against a step (55) of the master cylinder piston (5).

3. A hydraulic brake system as claimed in claim 2, wherein a lug (57) is coupled to the sealing member (52) which penetrates the spring plate (54) and which is positively connected to said spring plate (54).

4. A hydraulic brake system as claimed in claim 2, wherein a second compression spring (56) is clamped in between the spring plate (54) and the annular member (50).

* * * * *